United States Patent Office 2,947,602
Patented Aug. 2, 1960

2,947,602
PRODUCTION OF SODIUM PERBORATE IN STABLE FORM

Edward A. Youngman, Lafayette, and Richard M. Roberts, Berkeley, Calif., assignors to Shell Oil Company, a corporation of Delaware No Drawing. Filed Aug. 29, 1955, Ser. No. 531,272

7 Claims. (Cl. 23—60)

This invention relates to the production of an improved form of crystalline sodium perborate which is highly resistant to loss of active oxygen, is stable at higher temperatures, and has other desirable characteristics. The invention deals particularly with the production of this advantageous form of sodium perborate by reacting hydrogen peroxide with sodium borate.

Sodium perborate is a very useful source of active oxygen for bleaching and other purposes. In its more commonly available forms it has a number of disadvantages which limit its commercial applications. One of the more serious of these is the tendency to lose active oxygen during shipment and storage, especially when exposed to humid atmospheres in warm weather. Under these conditions there is also an undesirable tendency toward caking of the usual forms of sodium perborate.

Many proposals have been made for overcoming the disadvantages of the usual forms of sodium perborate. Various stabilizers have been suggested for reducing the tendency of the sodium perborate to lose active oxygen. It has also been proposed to vary the $Na_2O:B_2O_3$ ratio in the perborate or to control the particle size or bulk density as means for improving the characteristics of the final product. Dehydration of sodium perborate tetrahydrate to the crystalline monohydrate or production of amorphous forms of sodium perborate are other methods which have been used to obtain improvements in the perborate. None of these methods has been entirely successful, however, and ordinary sodium perborate tetrahydrate in spite of its disadvantages continues to be the chief commercial form of sodium perborate. The sodium perborate tetrahydrate of commerce is usually made by reacting sodium borate with hydrogen peroxide in aqueous solution at a temperature, generally about 15°–25° C., at which the tetrahydrate crystallizes from the solution and is recovered and dried.

An important object of the present invention is to provide a method for reacting sodium borate with aqueous hydrogen peroxide which gives sodium perborate trihydrate instead of the usual tetrahydrate. The greater stability of the trihydrate and its freedom from caking on exposure to the atmosphere make it a much more advantageous product than other forms of sodium perborate. It is thus another object of the invention to react hydrogen peroxide with sodium borate in aqueous solution to obtain sodium perborate of improved stability and reduced caking tendency which is stable in shipment and storage even when exposed to relatively high temperatures. Still other objects and advantages of the invention will be apparent from the following description.

It has been found unexpectedly that by reacting sodium borate with hydrogen peroxide in an aqueous medium at a temperature of at least 40° C. but not higher than 60° C. under conditions at which sodium perborate crystallizes from the mixture, one obtains the perborate in the form of trihydrate crystals $NaBO_2 \cdot H_2O_2 \cdot 2H_2O$ instead of the usual tetrahydrate form. The sodium perborate trihydrate thus produced is quite stable. It has a vapor pressure of $9.0 \pm 0.5$ mm. of mercury at 30° C. and much less tendency to cake or lose active oxygen during storage at ordinary or elevated temperatures than has the usual sodium perborate tetrahydrate. Another advantage is its higher active oxygen content of about 11.5 to 11.8% by weight compared to about 10.0 to 10.4% for the tetrahydrate.

In accordance with the invention this more advantageous form of sodium perborate is produced by contacting sodium borate with hydrogen peroxide in an aqueous medium at a temperature within the range of 40° to 60° C. and continuing the reaction until sodium perborate crystallizes from the mixture.

The process can be carried out batchwise or continuously. One convenient method of batch operation comprises intimately mixing sodium borate and aqueous hydrogen peroxide in controlled proportions while maintaining the temperature within the indicated critical range of 40° to 60° C., most advantageously between 45° and 55° C. until the desired crystallization takes place and removing and drying the sodium perborate trihydrate crystals obtained. The process can be carried out continuously by feeding the hydrogen peroxide and sodium borate, preferably as aqueous solution, to the reaction mixture continuously in controlled proportions while continuously withdrawing a corresponding volume of reacted mixture containing the sodium perborate trihydrate crystals which are produced. In either case, the mother liquor separated from the recovered trihydrate crystals is advantageously recycled to the reactor so that substantially complete conversion of the sodium borate to sodium perborate trihydrate is obtained.

It is highly desirable to promote rapid crystallization of the more stable trihydrate. To this end it is advantageous to seed the reaction mixture with trihydrate crystals from a previous batch. The tetrahydrate appears to be meta stable with respect to the trihydrate form but there is a kinetic bar to the formation of the more stable trihydrate. This is most readily overcome by seeding with crystals of the desired trihydrate. By partial conversion of an initial batch and use of about 5 to 20%, advantageously about 10 to 15% of the product as seed for a succeeding batch crystallization of the perborate in the desired form is promoted.

For rapid crystallization of the sodium perborate as stable trihydrate it is also desirable to avoid the presence of materials which reduce its rate of crystallization. One of these often encountered because it is used as a stabilizer for hydrogen peroxide and sodium perborate is magnesium silicate which, for best results, should not be present in amounts greater than 0.025 mole percent based on the hydrogen peroxide used. Larger amounts may so greatly reduce the rate of trihydrate crystallization that the product is chiefly or even exclusively the common, more rapidly crystallizing tetrahydrate form. As a general rule it is desirable that the crystallization be carried out within a period of not more than 6 hours, advantageously between about ½ and about 3 hours, in order to minimize loss of peroxide by decomposition. It is also desirable that no trace of sodium perborate tetrahydrate be present to avoid seeding of the undesired hydrate.

Sodium perborate stabilizing agents other than magnesium silicate can be advantageously used in the reaction mixture. Sodium silicate, Versene (ethylenediamine tetraacetic acid), magnesium chloride, sodium stannate, potassium pyrophosphate, and the like, including mixtures thereof, are useful. The amounts which will be most suitable will vary with the particular stabilizer or stabilizer mixture used but will generally be of the order of about 0.1 to 1.0 mole percent of the sodium perborate trihydrate produced. Magnesium silicate can be used as stabilizer if it is added after formation of the trihydrate so that it does not slow down the rate of trihydrate crystallization.

The sodium borate used for the reaction is sodium metaborate ($NaBO_2$) which may, if desired, be formed in the reaction mixture from the acid and base or otherwise. Usually it will be desirable to use at least one mole of hydrogen peroxide per $NaBO_2$ equivalent of the starting sodium borate and more advantageously an excess of hydrogen peroxide is employed but it is also feasible to carry out the reaction with lower proportions of hydrogen peroxide.

As a general rule it is desirable to use aqueous hydrogen peroxide of at least 15% concentration by weight, most advantageously of about 20% to about 35% by weight or higher, and to carry out the reaction with an aqueous solution of sodium borate having a concentration of about 25% to about 40% by weight calculated as $NaBO_2$, preferably using the more concentrated sodium borate solutions within this range with the more dilute hydrogen peroxide. Suitable concentrations of sodium borate in the mixture after addition of the hydrogen peroxide are about 18% to about 30% $NaBO_2$ by weight.

The following example illustrates one suitable method for carrying out the new process and shows some of the advantageous properties of the trihydrate.

Sodium metaborate (20 moles, prepared by reacting borax and sodium hydroxide) in 1500 grams distilled water containing 2.70 grams Versene (ethylenediaminetetraacetic acid) was stirred and heated to 50° C. Hydrogen peroxide (20 moles, 17% by weight hydrogen peroxide solution) and sodium perborate trihydrate seed (300 grams) were then added. The mixture was stirred and maintained at 48–50° C. for 2.5 hours, cooled to 40° C. for 20 minutes, and filtered.

The air dried product (2600 grams, 86% yield based on hydrogen peroxide) had the theoretical active oxygen content (11.8%).

The excellent storage stability of sodium perborate trihydrate at 60° C. is shown by the following results of tests in which it was compared with other forms of sodium perborate.

| Form of Perborate | Loss of Active Oxygen in 4 Days at 60° C., percent | Appearance of Product After 4 Days at 60° C. |
|---|---|---|
| Monohydrate $NaBO_2 \cdot H_2O_2$ | 6.7 | free flowing. |
| Mixture of monohydrate and tetrahydrate having average composition $NaBO_2 \cdot H_2O_2 \cdot 2H_2O$. | 17 | tacky. |
| True trihydrate $NaBO_2 \cdot H_2O_2 \cdot 2H_2O$ | 1 | free flowing. |
| Tetrahydrate $NaBO_2 \cdot H_2O_2 \cdot 3H_2O$ | | fully liquified. |

Other methods of carrying out the new method can also be used and it will be understood that the invention is not limited to the procedures which have been described by way of example nor by any theory proposed in explanation of the improved results which are obtained.

We claim as our invention:

1. A process for producing a sodium perborate of improved properties which comprises intimately contacting sodium metaborate and hydrogen peroxide as essentially the sole reactants in an aqueous medium while maintaining the mixture at a temperature within the range of 40° to 60° C. until crystallization of sodium perborate trihydrate therefrom takes place and separating the crystals so produced.

2. A process in accordance with claim 1 wherein the sodium metaborate is formed in the reaction mixture from borax and a base.

3. A process in accordance with claim 1 wherein crystals previously produced in the reaction are returned to contact with fresh sodium metaborate and aqueous hydrogen peroxide to promote further formation of said sodium perborate trihydrate.

4. A process for producing a crystalline sodium perborate more stable than the tetrahydrate which comprises adding preformed crystals of sodium perborate trihydrate to an aqueous mixture of sodium metaborate and hydrogen peroxide as essentially the sole reactants maintained at a temperature within the range of 45° to about 55° C. until substantial formation of crystalline sodium perborate trihydrate takes place, and separating and recovering the crystals thus formed.

5. In a process for producing sodium perborate trihydrate the steps of intimately contacting sodium metaborate and hydrogen peroxide as essentially the sole reactants in the proportions of about one mole of hydrogen peroxide per mole of the sodium metaborate in an aqueous medium while maintaining the temperature of the mixture within the range of 40° to 60° C. until substantial crystallization of sodium perborate trihydrate therefrom takes place and separating and recovering the sodium perborate trihydrate crystals thus produced.

6. In a process in accordance with claim 5, the method of increasing the yield of sodium perborate trihydrate which comprises recycling to the reaction mother liquor separated from the recovered trihydrate crystals and about 5 to 20% of sodium perborate trihydrate crystals based upon the amount of sodium borate fed to the reaction.

7. A process in accordance with claim 6 wherein the reaction is carried out at about atmospheric pressure in the presence of sodium perborate stabilizer substantially free from magnesium silicate.

References Cited in the file of this patent

UNITED STATES PATENTS

| 910,490 | Bock | Jan. 26, 1909 |
| 1,991,410 | Newman | Feb. 19, 1935 |

FOREIGN PATENTS

| 548,432 | Germany | Apr. 12, 1932 |
| 611,439 | Great Britain | Oct. 29, 1948 |